Feb. 5, 1929.                                             1,701,261
                         J. FOX
                      ANIMAL TRAP
                   Filed Oct. 24, 1927
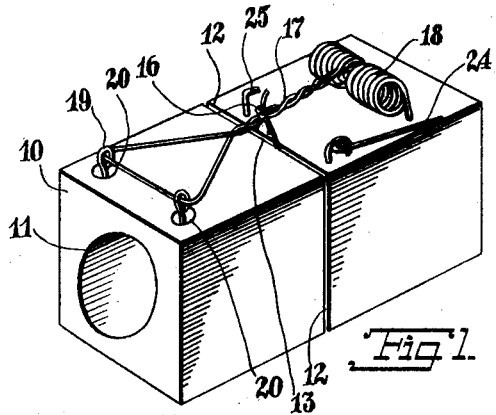
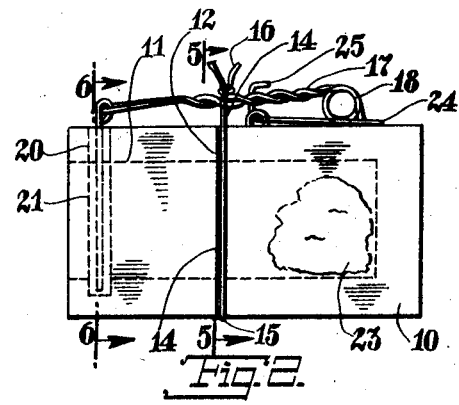
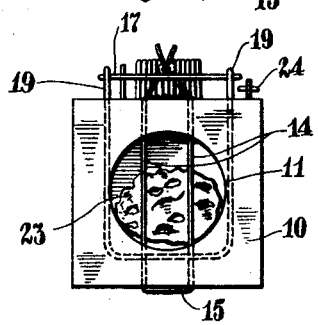
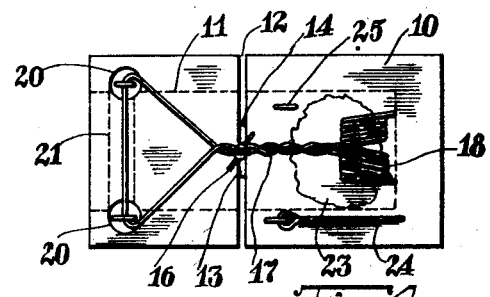
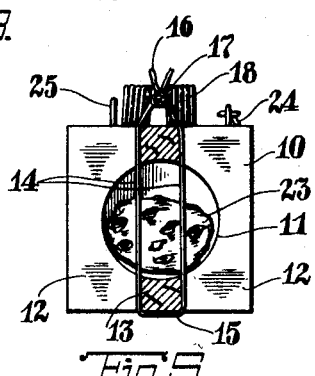
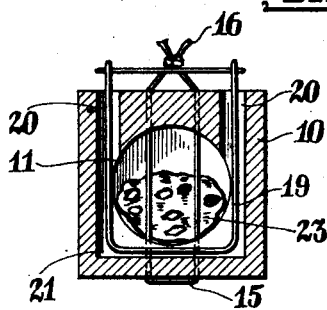
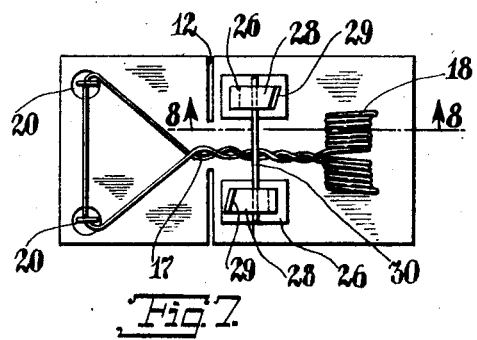
INVENTOR.
John Fox
BY
ATTORNEY Patented Feb. 5, 1929.

1,701,261

UNITED STATES PATENT OFFICE.

JOHN FOX, OF NEW YORK, N. Y.

ANIMAL TRAP.

Application filed October 24, 1927. Serial No. 228,125.

This invention relates generally to animal traps, and has more particular reference to a novel mouse and rat trap.

The invention has for an object the provision of a mouse trap of simple durable construction, which is desirable and efficient in operation, and which can be manufactured and sold at a reasonable cost.

The invention makes use of a trap body formed with slots to accommodate a thread, or string, which is tied to normally hold a trap catch down. A chamber for bait is arranged behind the said thread so as to be in the way of a mouse attempting to reach the bait. Naturally the mouse will break the thread, and the trap catch will be released, catching the mouse. A latch device is arranged on the trap body, capable of holding the trap catch in downward, or set condition. The trap may then be loaded by placing bait in the bait chamber, next passing the thread around the slots and the trap catch, and tying the thread in this condition. The latch device is next released from the trap catch, and the trap is then in set condition.

For further comprehension of the invention, and of the objects and advantages thereof, reference will be had to the following description and accompanying drawings, and to the appended claims in which the various novel features of the invention are more particularly set forth.

Referring to the accompanying drawing, forming a material part of this disclosure:—

Fig. 1, is a perspective view of a device constructed according to this invention.

Fig. 2, is a side view thereof.

Fig. 3, is an end view thereof.

Fig. 4, is a plan view thereof.

Fig. 5, is a transverse vertical sectional view, taken on the line 5—5 of Fig. 2.

Fig. 6, is a transverse vertical sectional view, taken on the line 6—6 of Fig. 2.

Fig. 7, is a plan view similar to Fig. 4, but illustrating a modification thereof.

Fig. 8, is a fragmentary vertical sectional view, taken on the line 8—8 of Fig. 7.

The reference numeral 10 indicates generally a trap body having an aperture 11 extended inwards from one of the sides, and terminating before reaching the opposite side. Slots 12 are formed in the trap body so as to provide spacers 13 to determine the positions of spaced threads 14, which are integral at the bottom, as at 15, and knotted together at the top, as at 16, and above arm 17 so as to hold this arm down. The arm 17 connects at one end, to a spring 18 secured to the body 10, and acting to urge the arm upwards, and at the other end the arm branches and connects to the top ends of a U-shaped catch 19. The top ends of the U-shaped catch 19 project thru apertures 20 in the body 10, and the lower part disposes within a recess 21 within the body 10 and around the aperture 11.

The bait chamber is the portion of aperture 11 to the right of thread 14 in Fig. 2, and bait 23 is shown therein. A mouse entering the aperture 11 and attempting to reach bait 23, must necessarily break thread 14. When the thread 14 is broken, the arm 17 moves upwards due to the action of spring 18. The catch 19 is moved upwards by arm 17, and clamps the mouse against the top of aperture 11.

The trap may be set by manually forcing the arm 17 to its downward position, and have some latching device temporarily hold the arm in this position while the thread 14 is applied, thereafter disengaging the arm. A rod 24 is pivotally connected at one end to the body 10, on one side of the arm 17 and is engageable with hook 25 attached to the body on the other side of the arm 17 so as to hold the arm in its downward position for the purpose just mentioned. Figs. 7 and 8 disclose another latching means consisting of bases 26 secured to the body 10 and on opposite sides of arm 17, studs 27 projecting vertically from the bases and rotatively mounted, and blocks 28 having grooves 29, the blocks being threadedly engaged by the studs. A rod 30 is engaged in the grooves 29 and clamps the arm 17 in its downward position. The studs may be turned to adjust the height of the blocks so that the rod 30 may properly clamp arm 17.

While I have above described the preferred form, construction and arrangements of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention what I claim as new, and desire to secure by United States Letters Patent is:

1. An animal trap, comprising a trap body with a spring operated animal catch having an arm arranged for tying into a set position disposed across the top of the said trap, bases secured on the trap body on opposite sides of the said arm, studs projecting vertically from the bases and rotatively mounted, blocks with grooves, threadedly engaged on the studs, and a rod engaged in the said grooves for clamping the said arm temporarily for tying with the catch in set condition, the said studs may be turned for moving the blocks so as to provide for the proper clamping of the said arm.

2. An animal trap, comprising a trap body with a spring operated animal catch having an arm arranged for tying into a set position disposed across the top of the said trap, bases secured on the trap body on opposite sides of the said arm, studs projecting from the bases and rotatively mounted, blocks with grooves, threadedly engaged on the studs, and a rod engaged in the said grooves for clamping the said arm temporarily for tying with the catch in set condition, the said studs may be turned for moving the blocks so as to provide for the proper clamping of the said arm.

3. An animal trap, comprising a trap body with a spring operated animal catch having an arm arranged for tying into a set position disposed across the top of the said trap, bases secured on the trap body on opposite sides of the said arm, studs projecting vertically from the bases and rotatively mounted, blocks threadedly engaged on the studs, and a rod connected with the blocks and arranged for clamping the said arm temporarily for tying with the catch in set condition, the said studs may be turned for moving the blocks so as to provide for the proper clamping of the said arm.

In testimony whereof I have affixed my signature.

JOHN FOX.